(12) United States Patent
Matsumoto et al.

(10) Patent No.: US 9,246,169 B2
(45) Date of Patent: Jan. 26, 2016

(54) POSITIVE ELECTRODE ACTIVE MATERIAL FOR NONAQUEOUS ELECTROLYTE SECONDARY BATTERY, METHOD FOR MAKING THE SAME, POSITIVE ELECTRODE INCLUDING THE SAME, AND BATTERY INCLUDING THE POSITIVE ELECTRODE

(75) Inventors: Hiroyuki Matsumoto, Kobe (JP); Takeshi Ogasawara, Kobe (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 899 days.

(21) Appl. No.: 13/169,622

(22) Filed: Jun. 27, 2011

(65) Prior Publication Data

US 2011/0318653 A1    Dec. 29, 2011

(30) Foreign Application Priority Data

Jun. 28, 2010  (JP) ................................. 2010-146616
Feb. 23, 2011  (JP) ................................. 2011-036716

(51) Int. Cl.
*H01M 4/505* (2010.01)
*H01M 4/36* (2006.01)
*H01M 4/525* (2010.01)
*H01M 4/62* (2006.01)
*H01M 10/052* (2010.01)
*H01M 10/0567* (2010.01)

(52) U.S. Cl.
CPC .............. *H01M 4/505* (2013.01); *H01M 4/366* (2013.01); *H01M 4/525* (2013.01); *H01M 4/62* (2013.01); *H01M 10/052* (2013.01); *H01M 10/0567* (2013.01); *Y02E 60/122* (2013.01)

(58) Field of Classification Search
CPC ..... H01M 4/505; H01M 4/366; H01M 4/525; H01M 10/052; H01M 10/0567
USPC ....................................................... 429/231.95
See application file for complete search history.

(56) References Cited

U.S. PATENT DOCUMENTS

| | | |
|---|---|---|
| 2002/0071990 A1 | 6/2002 | Kweon et al. |
| 2004/0018429 A1 | 1/2004 | Kweon et al. |
| 2006/0246352 A1 | 11/2006 | Kweon et al. |
| 2008/0318131 A1* | 12/2008 | Watanabe et al. ........ 429/231.95 |

FOREIGN PATENT DOCUMENTS

| | | | |
|---|---|---|---|
| JP | 10-125327 A | 5/1998 | |
| JP | 2005-166558 | * 6/2005 | ............. H01M 4/58 |
| JP | 2009-218217 A | 9/2009 | |

* cited by examiner

*Primary Examiner* — Helen O Conley
(74) *Attorney, Agent, or Firm* — Westerman, Hattori, Daniels & Adrian, LLP

(57) ABSTRACT

A positive electrode active material for a nonaqueous electrolyte secondary battery includes a positive electrode active material particle and a compound containing a rare earth element and a carbonate, the compound having a particle size of 1 to 100 nm and being adhered to a surface of the positive electrode active material particle. The ratio of the compound relative to the positive electrode active material particle is 0.005% to 0.4% by mass on a rare earth element basis. The positive electrode active material particle is composed of a lithium transition metal oxide having a layered structure.

16 Claims, 4 Drawing Sheets

POSITIVE ELECTRODE ACTIVE MATERIAL FOR NONAQUEOUS ELECTROLYTE SECONDARY BATTERY, METHOD FOR MAKING THE SAME, POSITIVE ELECTRODE INCLUDING THE SAME, AND BATTERY INCLUDING THE POSITIVE ELECTRODE

CROSS REFERENCE TO RELATED APPLICATIONS

The present application claims priority to Japanese Patent Application No. 2011-146616 filed in the Japan Patent Office on Jun. 28, 2011 and claims priority to Japanese Patent Application No. 2011-036716 filed in the Japan Patent Office on Feb. 23, 2011, the entire contents of which are incorporated herein by reference.

BACKGROUND OF THE INVENTION

1. Field of the Invention

The present invention relates to improvements of a positive electrode active material for a nonaqueous electrolyte secondary battery, a method for making the positive electrode active material, etc. The present invention relates to a positive electrode active material for a nonaqueous electrolyte secondary battery that can yield high reliability even when the battery features high capacity, a method for making the positive electrode active material, etc.

2. Description of Related Art

Reduction of the size and weight of mobile information terminals such as cellular phones, notebook computers, and personal digital assistants (PDAs) has progressed rapidly in recent years, and batteries used for driving such terminals are required to achieve ever higher capacity. Of the secondary batteries that can meet such demand, nonaqueous secondary batteries that use an alloy, a carbon material, or the like that can occlude and release lithium ions, as a negative electrode active material and a lithium transition metal complex oxide as a positive electrode active material are drawing much attention as a battery that has a high energy density.

The capacity of nonaqueous electrolyte secondary batteries has been increased by reducing the thickness of components not related to the capacity, such as a battery can, a separator, and a collector (aluminum foil or copper foil), and by increasing the amount of the active material packed in the electrode (improvement of electrode packing density). However, even if those approaches for increasing the capacity are employed, the capacity of the nonaqueous electrolyte secondary batteries cannot be sufficiently increased. Another conceivable approach to increasing the capacity and energy density is to raise the charge cut-off voltage. However, if the charge final voltage is raised, the positive electrode active material may be deteriorated and the electrolyte may be decomposed by oxidation, resulting in lowering of the battery characteristics.

To address this issue, as described below, there has been proposed a technique for suppressing the reaction between the positive electrode and the electrolyte in a charged state.

A positive electrode active material for a lithium secondary battery has been proposed in Japanese Unexamined Patent Application Publication No. 2009-218217 (Patent Document 1). This positive electrode active material includes a core that contains at least one lithium compound and a surface-treated layer on the core and exhibits good electrochemical characteristics such as lifetime, discharge potential, and electric energy characteristic since the surface-treated layer contains at least one coating material selected from a hydroxide, an oxyhydroxide, an oxycarbonate, and a hydroxycarbonate of a coating element which is at least one metal selected from the group consisting of Mg, Al, Co, K, Na, Ca, Si, Ti, Sn, V, Ge, Ga, B, As, Zr, and a mixture thereof.

However, this technique does not sufficiently suppress the reaction between the positive electrode and the electrolyte in a high-temperature high-voltage charge state. When a battery is stored and retained in this state, formation of films and gassing caused by decomposition of the electrolyte cannot be sufficiently suppressed.

BRIEF SUMMARY OF THE INVENTION

The present invention provides a positive electrode active material for a nonaqueous electrolyte secondary battery, the positive electrode active material being capable of suppressing significant deterioration of the charge-discharge performance caused by gassing inside the battery and excessive formation of decomposition films on the positive electrode surface resulting from decomposition of the electrolyte even when the battery is retained in a high temperature, high-voltage charge state. A method for making this positive electrode active material, a positive electrode that includes the positive electrode active material, and a battery that includes the positive electrode are also provided.

According to one aspect of the present invention, a positive electrode active material is composed of a lithium transition metal oxide that includes a positive electrode active material particle having a layered structure and a compound containing a rare earth element and a carbonate (this compound may be simply referred to as "compound" in this specification) and adhering to a surface of the positive electrode active material particle. The particle size of the compound is 1 nm to 100 nm, and the ratio of the compound to the positive electrode active material particle is 0.005% to 0.4% by mass on a rare earth element basis.

The positive electrode active material of a nonaqueous electrolyte secondary battery mainly contains a transition metal such as cobalt, nickel, or the like. Since the transition metal functions as a catalyst in the battery, the transition metal accelerates decomposition of the electrolyte. However, when the compound is adhered to a surface of the positive electrode active material particle, the catalytic property of the positive electrode active material is significantly lowered and decomposition of the electrolyte is significantly suppressed. This is completely different from the aforementioned technology of reducing the contact area between the electrolyte and the positive electrode active material particle by coating the surface of the positive electrode active material particle with a coating material. Compared to the related art, the effect of suppressing the decomposition of the electrolyte is significantly improved. Thus, the effect of the invention is also completely different.

When a battery that includes the positive electrode active material of the present invention is retained under a high temperature and high voltage, degradation of the charge-discharge performance caused by swelling of the battery by gassing inside the battery caused by decomposition of the electrolyte and the increase in resistance of the positive electrode surface caused by formation of excessive decomposition films on the positive electrode surface can be suppressed.

The ratio of the compound to the positive electrode active material particle is 0.005% to 0.4% by mass on a rare earth element basis. The aforementioned effect (suppression of the degradation of the charge-discharge performance caused by swelling of the battery by gassing inside the battery caused by decomposition of the electrolyte and suppression of the increase in resistance of the positive electrode surface caused by formation of excessive decomposition films on the positive electrode surface) is not sufficient at a ratio less than 0.005% by mass. At a ratio exceeding 0.40% by mass, the surface of the positive electrode active material particle is excessively covered with the compound that does not contribute to the charge-discharge reaction, thereby increasing the resistance, inhibiting the discharge reaction, and lowering the discharge capacity. The ratio of the compound is more preferably 0.01 to 0.34% by mass and most preferably 0.015 to 0.2% by mass.

The particle size of the compound is 1 nm to 100 nm because the surface of the positive electrode active material particle is excessively covered with the compound and the aforementioned problems may occur when the particle size is less than 1 nm. Moreover, it may be difficult to synthesize a compound having a particle size smaller than 1 nm. When the particle size exceeds 100 nm, the amount of the compound per unit area decreases excessively and the effect of decreasing the catalytic property of the positive electrode active material may not be sufficiently exhibited. The particle size of the compound is more preferably 1 nm to 50 nm.

The positive electrode active material particle is a lithium transition metal oxide having a layered structure because of the following reason. When a positive electrode active material particle not having a layered structure is used (e.g., when a spinel-structured lithium manganese complex oxide is used as the positive electrode active material particle), the catalytic property of the positive electrode active material particle is low despite the incorporation of a transition metal, and thus the decomposition of the electrolyte does not readily occur. Accordingly, having the compound adhering to the positive electrode active material particle does not lead to a full effect of suppressing the decomposition.

Note that the compound may partly contain, in addition to a carbonate of a rare earth element, a hydrated water (e.g., when the rare earth element is Er, $Er_2(CO_3)_3 \cdot nH_2O$ (n>0)), a hydroxide of a rare earth element, and/or an oxyhydroxide of a rare earth element.

The compound is preferably adhered to the surface of the positive electrode active material particle in a dispersed form so that the effect of reducing the catalytic property can be exhibited in a wide range of the surface of the positive electrode active material particle.

The rare earth element of the compound is preferably at least one selected from the group consisting of erbium, lanthanum, neodymium, samarium, and europium. These elements suppress decomposition of the electrolyte compared to other rare earth elements. Thus, the discharge voltage drop can be reduced and the capacity retention can be improved. In order to further suppress the discharge voltage drop, the rare earth element is more preferably erbium, lanthanum, or neodymium.

Another aspect of the present invention is a positive electrode for a nonaqueous electrolyte secondary battery, the positive electrode containing the positive electrode active material described above. The present invention also includes a nonaqueous electrolyte secondary battery that includes such a positive electrode, a negative electrode, a separator, and a nonaqueous electrolyte.

The nonaqueous electrolyte preferably contains a nitrile compound that contains a chain saturated hydrocarbon group and a nitrile group. Such a nitrile compound forms a film on the positive electrode surface during the initial charge-discharge operation. Thus, when the nitrile compound is used in combination with the positive electrode active material having a surface to which a compound containing a rare earth element and a carbonate is adhered, decomposition of the electrolyte on the positive electrode surface can be suppressed.

The number of nitrile groups in the nitrile compound is preferably 2 or 3. When the number of nitrile groups is 2 or more, the film becomes more stable. However, a compound having 4 or more nitrile groups may not be readily available.

Another aspect of the present invention is a method for making a positive electrode active material, the method including a compound adhering step of adding a positive electrode active material particle to a solution of carbon dioxide and adding a solution of a salt containing at least one rare earth element selected from the group consisting of rare earth elements to the resulting mixture so as to allow a compound containing a rare earth element and a carbonate to adhere to a surface of the positive electrode active material particle.

According to this method, a positive electrode active material in which a compound having a particle size of 1 to 100 nm is adhered to the surface of the positive electrode active material particle in a dispersed form can be prepared.

A battery that uses a positive electrode prepared by using a slurry made by adding erbium carbonate or the like to positive electrode active material powder has been proposed (Japanese Unexamined Patent Application Publication No. 10-125327) (Patent Document 2). While the proposal may appear similar to the present invention, it is not. When erbium carbonate or the like is added to a slurry, the compound segregates on recesses in the surface of the positive electrode active material particle and the like (the compound does not adhere to the surface of the positive electrode active material particle in a dispersed form). Thus, the gassing suppressing effect is not exhibited. This is natural since Patent Document 2 aims to improve the safety by accelerating decomposition of the electrolyte and gassing in an overcharge test or a burner heating test so that the safety mechanism operates in an early stage. The object of Patent Document 2 is not to improve various battery characteristics by suppressing decomposition of the electrolyte as in the present invention. Moreover, Patent Document 2 significantly differs from the present invention in that the particle size of the carbonate is only limited to 10 m or less (although no lower limit is specified, the lower limit of the particle size in the Examples is 1 m) and the carbonate content is limited to 0.2% by mass or more on a $CO_3$ basis.

The salt containing the rare earth element (rare earth salt) may be a nitrate, a sulfate, or an acetate.

In the compound adhering step, in adding the solution of the salt containing the rare earth element, the pH of the solution to which the positive electrode active material is added is preferably controlled to 6 to 11. When the pH is controlled as such, the compound can be more easily adhered to the surface of the positive electrode active material particle in a more evenly dispersed form.

After the compound adhering step, a heat treatment step of performing heat treatment at a temperature of 500° C. or less is preferably conducted.

Moisture in the positive electrode active material can be removed by the heat treatment. The heat treatment temperature may be 500° C. or less since at a temperature exceeding 500° C., the compound is transformed to an oxide of the rare earth element and part of the rare earth element becomes dispersed in the interior of the positive electrode active material particle. As a result, the discharge performance is degraded and the effect of suppressing the decomposition reaction of the electrolyte cannot be obtained on the surface of the positive electrode active material particle. Although the lower end of the temperature range of the heat treatment temperature is not set, the lower end is preferably 80° C. or more. At a temperature less than 80° C., moisture may not be completely removed from the positive electrode active material.

A bubbling technique is preferably used to dissolve carbon dioxide in the solution. Carbon dioxide can be easily dissolved by using this technique.

According to the present invention, even when a battery is stored in a high-temperature, high-voltage condition, significant degradation of the charge-discharge performance caused by gassing in the battery resulting from decomposition of the electrolyte and formation of excessive decomposition films on the positive electrode surface can be suppressed. Accordingly, various battery characteristics can be significantly improved.

DETAILED DESCRIPTION OF THE INVENTION

The present invention will now be described in detail through embodiments below. The present invention is not limited by the embodiments described below and may be implemented with modifications and alterations without departing from the scope of the present invention.

[Preparation of Positive Electrode]

To 3 L of pure water in which a sufficient amount of carbon dioxide gas (carbonic acid gas) was dissolved, 500 g of lithium cobaltate particles (positive electrode active material particle having a layered structure) containing 1.5 mol % of Mg and 1.5 mol % of Al in form of solid solution, and 0.05 mol % of Zr were added, followed by stirring. The technique employed to dissolve carbon dioxide in pure water was a bubbling technique of bubbling carbon dioxide gas in pure water at a rate of 300 mL/min for 15 minutes (4.50 L in total). It is considered that this bubbling will have a sufficient amount of carbon dioxide dissolved in pure water because of the following reason.

The solubility of carbon dioxide at a temperature of 20° C. in a 1 atm atmosphere is 0.878 L relative to 1 L of pure water. Saturation is reached once 2.63 L of carbon dioxide is dissolved in 3 L of pure water. Since 4.50 L of carbon dioxide is bubbled into 3 L of pure water in the process described above, it is considered that a sufficient amount of carbon dioxide is dissolved in pure water.

Figure 5:
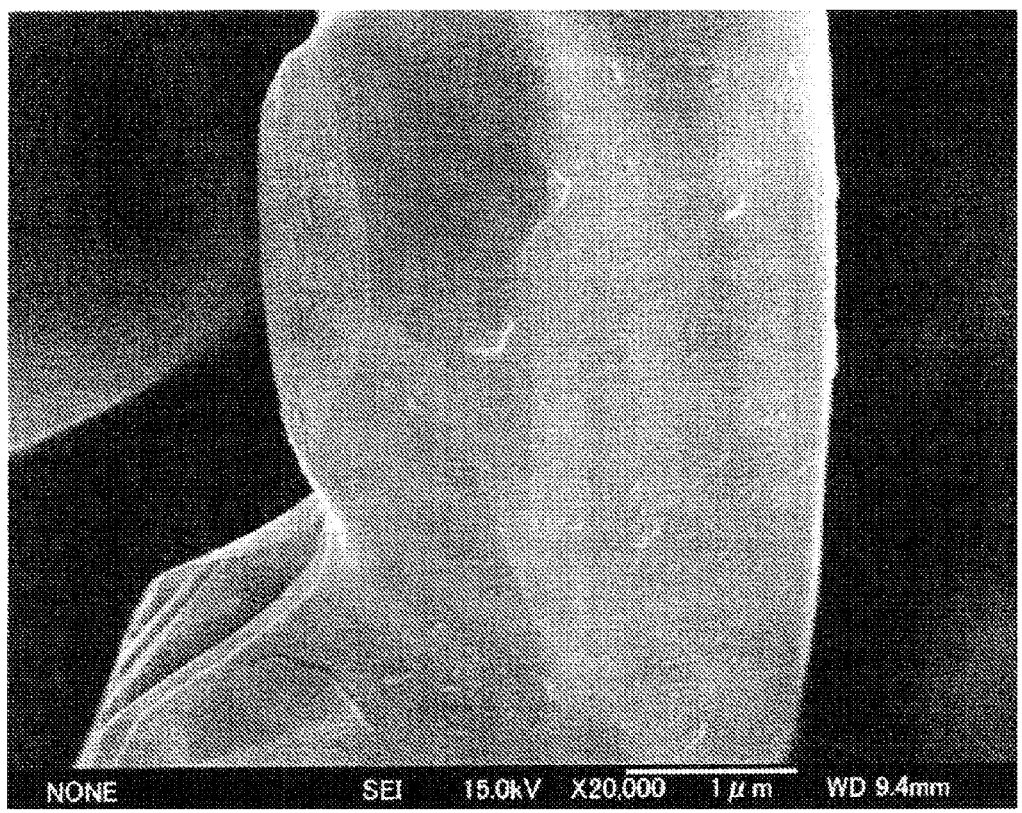
FIG. 5 is an image of a positive electrode active material used in Example Battery A1 observed with a scanning electron microscope (SEM).

A solution of 0.91 g of erbium nitrate pentahydrate (Er $(NO_3)_3.5H_2O$) was added thereto. To the resulting solution, 10% by mass of an aqueous nitric acid solution and 10% by mass of an aqueous sodium hydroxide solution were added to adjust the pH of the solution to 9.0. During this process, carbon dioxide gas bubbling was continued at the same rate (300 mL/min). Then the solution was subjected to suction filtration and washed with water to obtain powder. The powder was dried at 120° C. As a result, lithium cobaltate particles with a compound containing erbium and a carbonate adhered thereto were obtained. The powder was baked for 5 hours at 300° C. to obtain a positive electrode active material. The positive electrode active material was observed with a scanning electron microscope (SEM). The observation found that the compound 100 nm or less in particle size and containing erbium and a carbonate was evenly dispersed on the surface of the lithium cobaltate particle (refer to FIG. 5). The amount of the adhering compound relative to the lithium cobaltate was found to be 0.069% by mass on an elemental erbium basis (0.037% by mass on a $CO_3$ basis).

The positive electrode active material, carbon as a conducting agent, and polyvinylidene fluoride (PVDF) as a binder were prepared so that the mass ratio thereof was 95:2.5:2.5, and kneaded in an N-methyl-2-pyrrolidone (NMP) solution to prepare a positive electrode active material slurry. Lastly, a particular amount of the positive electrode active material slurry was applied on both sides of an aluminum foil used as a positive electrode collector, dried, and rolled so that the packing density was 3.6 g/cc to make a positive electrode.

[Preparation of Negative Electrode]

Graphite as a negative electrode active material, a styrene butadiene rubber (SBR) as an adhesive, and carboxylmethyl cellulose (CMC) as a thickener were prepared so that the mass ratio thereof was 98:1:1, and kneaded in an aqueous solution to prepare a negative electrode active material slurry. A particular amount of the negative electrode active material slurry was applied on both sides of a copper foil used as a negative electrode collector, dried, and rolled so that the packing density was 1.7 g/cc to make a negative electrode.

[Preparation of Nonaqueous Electrolyte]

In an ethylene carbonate (EC)-diethyl carbonate (DEC) (3:7 on a volume basis) mixed solvent, 1 mol/L of lithium hexafluorophosphate ($LiPF_6$) and 1% by mass of vinylene carbonate (VC) relative to the mixed solvent were dissolved to prepare a nonaqueous electrolyte.

[Preparation of Battery]

A positive electrode collector tab and a negative electrode collector tab were respectively attached to the positive electrode and the negative electrode. The electrodes were then spirally wound with a separator therebetween to prepare a spiral wound electrode assembly. Next, the spiral wound electrode assembly was pressed flat to prepare a flat electrode assembly. The flat electrode assembly was placed in an aluminum laminate serving as a battery package. Lastly, the nonaqueous electrolyte was injected into the package to prepare a nonaqueous electrolyte secondary battery.

Figure 1:
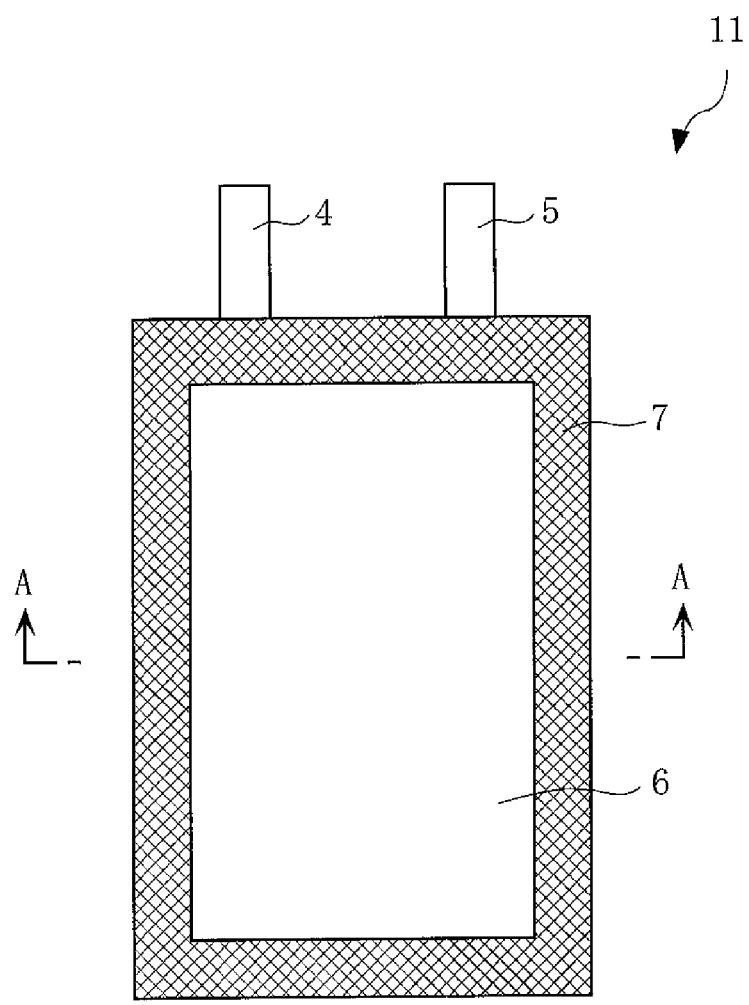
FIG. 1 is a front view of a test battery according to an embodiment of the present invention.
Figure 2:
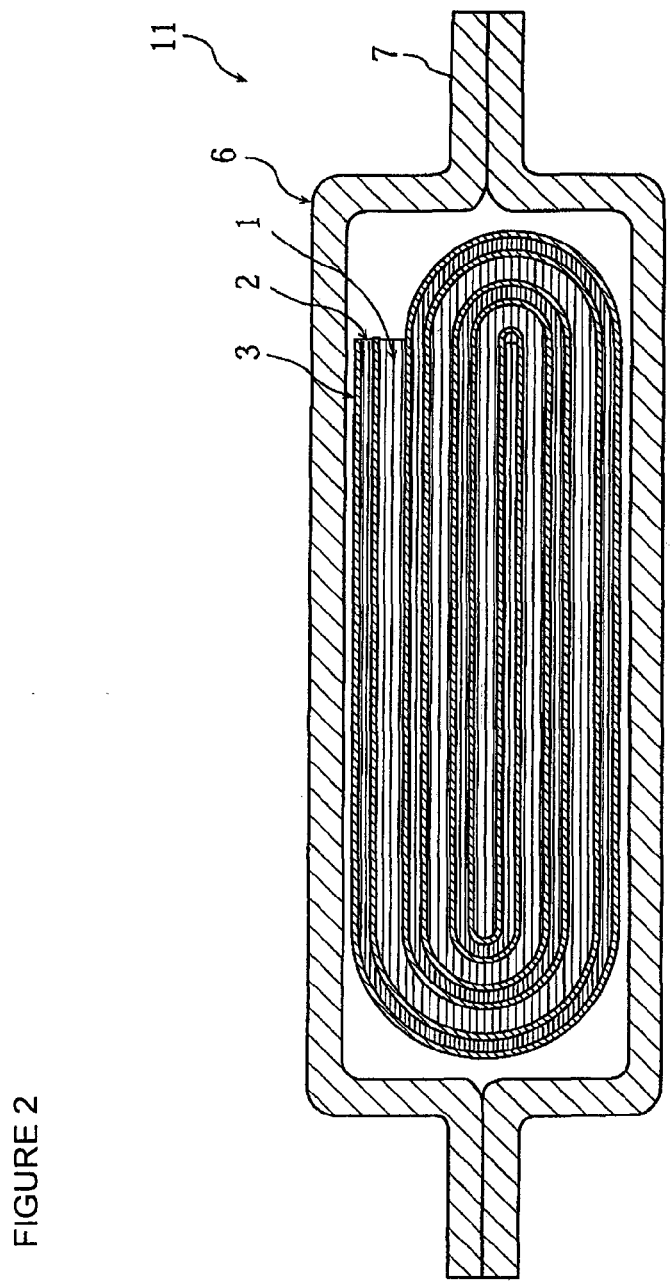
FIG. 2 is a schematic cross-sectional view taken at line A-A in FIG. 1.

As shown in FIGS. 1 and 2, the specific structure of a nonaqueous electrolyte secondary battery 11 is as follows. A positive electrode 1 and a negative electrode 2 are arranged to oppose each other with a separator 3 therebetween. A flat electrode assembly constituted by the positive and negative electrodes 1 and 2 and the separator 3 is impregnated with a nonaqueous electrolyte. The positive electrode 1 and the negative electrode 2 are respectively connected to a positive electrode collector tab 4 and a negative electrode collector tab 5 so that the battery can be charged and discharged and used as a secondary battery. The electrode assembly is placed in a space surrounded by an aluminum laminate package 6 having a closing part 7 formed by heat-sealing the peripheral portion.

(Other Features)

(1) The technique for dissolving a sufficient amount of carbon dioxide in pure water is not limited to the bubbling technique described above. A carbonic acid compound may be dissolved in pure water. In order to dissolve carbon dioxide gas easily and at low cost, a bubbling technique is preferably employed.

(2) The negative electrode active material used in the present invention is not limited to graphite. Any material that can occlude and release lithium may be used. Examples of the material include carbon materials such as graphite and coke, metal oxides such as tin oxide, a metal, such as silicon and tin, that can be alloyed with lithium and occlude lithium, and metallic lithium. Among these, graphite-based carbon materials are preferred since they do not undergo a large volume change by occlusion and release of lithium and have good reversibility.

(3) The positive electrode active material particle is not limited to lithium cobaltate and may be a nickel-containing lithium complex oxide such as a Ni—Co—Mn lithium complex oxide, a Ni—Al—Mn lithium complex oxide, or a Ni—Co—Al lithium complex oxide. Since the present invention is particularly effective for improving high-temperature characteristics in high voltage charging, a material having a layered structure that contains Co or Ni compatible with high-voltage charging is used. These materials may be used alone or in combination with another positive electrode active material.

(4) The solvent of the nonaqueous electrolyte used in the present invention is not limited to one described above and any commonly used solvent for nonaqueous electrolyte secondary batteries may be used. Examples thereof include cyclic carbonates such as ethylene carbonate, propylene carbonate, butylene carbonate, and vinylene carbonate; chain carbonate such as dimethyl carbonate, methyl ethyl carbonate, and diethyl carbonate; ester-containing compounds such as methyl acetate, ethyl acetate, propyl acetate, methyl propionate, ethyl propionate, and -butyrolactone; sulfone-containing compounds such as propane sultone; nitrile compounds described below; and amide-containing compounds such as dimethylformamide. A solvent which is any one of these with some H substituted with F is preferably used. These materials may be used alone or in combination. A solvent containing a cyclic carbonate and a chain carbonate or a solvent containing a cyclic carbonate, a chain carbonate, and a small amount of a nitrile-containing compound or an ether-containing compound is preferred.

The nitrile compound is preferably a compound having 4 to 12 carbon atoms (including carbon atoms in the nitrile groups). When the number of carbon atoms is less than 4, formation of the film that occurs in the early stage of charging tends to be insufficient. When the number of carbon atoms exceeds 12, the melting point and viscosity of the nitrile compound become high. The number of nitrile groups is preferably 2 or 3.

Examples of the nitrile compound include compounds containing one nitrile group such as butyronitrile, valeronitrile, capronitrile, enanthonitrile, caprylonitrile, pelargonnitrile, caprinitrile, lauronitrile, palmitonitrile, and stearonitrile; compounds containing two nitrile groups such as succinonitrile, glutaronitrile, adiponitrile, pimelonitrile, suberonitrile, azelanitrile, sebaconitrile, dodecanedinitrile, tetramethylsuccinonitrile, and 2-methyl glutaronitrile; and compound containing three nitrile groups such as 1,2,3-propanetricarbonitrile and 1,3,5-pentanetricarbonitrile.

The solute of the nonaqueous electrolyte is not limited to $LiPF_6$, and may be $LiBF_4$, $LiN(SO_2CF_3)_2$, $LiN(SO_2C_2F_5)_2$, or $LiPF_{6-x}(C_nF_{2n-1})_x$ [where $1<x<6$ and $n=1$ or $2$], for example. These solutes may be used alone or in combination. The solute concentration is not particularly limited but is preferably 0.8 to 1.5 mol per liter of the electrolyte.

EXAMPLES

First Example

Example 1

A battery was fabricated by the same method as described above in the embodiment. This test cell is hereinafter referred to as "Example Battery A1".

Example 2

A battery was fabricated as in Example 1 except that the amount of the compound containing erbium and a carbonate was changed to 0.017% by mass on an elemental erbium basis (0.0093% by mass on a $CO_3$ basis) relative to lithium cobaltate. This test cell is hereinafter referred to as "Example Battery A2".

Example 3

A battery was fabricated as in Example 1 except that the amount of the compound containing erbium and a carbonate was changed to 0.34% by mass on an elemental erbium basis (0.18% by mass on a $CO_3$ basis). This test cell is hereinafter referred to as "Example Battery A3".

Comparative Example 1

A battery was fabricated as in Example 1 except that a compound containing erbium and a carbonate was not adhered to the surface of lithium cobaltate particles (positive electrode active material particle) containing 1.5 mol % of Mg and 1.5 mol % of Al in form of solid solution, and 0.05 mol % of Zr. This test cell is hereinafter referred to as "Comparative Battery Z1".

Comparative Example 2

A battery was fabricated as in Example 1 except that the amount of the compound containing erbium and a carbonate was changed to 0.43% by mass on an elemental erbium basis (0.23% by mass on a $CO_3$ basis) relative to lithium cobaltate. This test cell is hereinafter referred to as "Comparative Battery Z2".

Comparative Example 3

A battery was fabricated as in Example 1 except that instead of adhering a compound containing erbium and a carbonate to the surface of lithium cobaltate particles, 0.069% by mass on an elemental erbium basis (0.037% by mass on a $CO_3$ basis) of erbium carbonate dihydrate about 300 nm in size was added during preparation of the positive electrode active material slurry. This test cell is hereinafter referred to as "Comparative Battery Z3".

Comparative Example 4

A battery was prepared as in Example 1 except that instead of adhering a compound containing erbium and a carbonate to the surface of lithium cobaltate particles, 0.58% by mass on an elemental erbium basis (0.31% by mass on a $CO_3$ basis) of erbium carbonate dihydrate about 300 nm in size was added during preparation of the positive electrode active material slurry. This test cell is hereinafter referred to as "Comparative Battery Z4".

Comparative Example 5

A battery was fabricated as in Example 1 except that the heat treatment temperature during preparation of the positive electrode active material was changed to 600° C. Because the heat treatment temperature was 600° C., the compound containing erbium and a carbonate was transformed into erbium oxide. This test cell is hereinafter referred to as "Comparative Battery Z5".

Comparative Example 6

A battery was fabricated as in Example 1 except that magnesium nitrate hexahydrate was used instead of erbium nitrate pentahydrate in adhering a compound containing magnesium and carbonate to the surface of lithium cobaltate particles. The amount of the compound containing magnesium and a carbonate was 0.010% by mass on an elemental magnesium basis (0.025% by mass on a $CO_3$ basis) relative to lithium cobaltate. The amount of the adhering compound containing magnesium and a carbonate is equal to the number of moles of the compound containing erbium and a carbonate used in Example 1 in terms of the number of moles of magnesium. This test cell is hereinafter referred to as "Comparative Battery Z6".

Comparative Example 7

A battery was fabricated as in Example 1 except that instead of erbium nitrate pentahydrate, zirconium oxynitrate (zirconyl nitrate) was used to adhere a compound containing zirconium and a carbonate to a surface of lithium cobaltate particles. The amount of the adhering compound containing zirconium and a carbonate was 0.038% by mass on an elemental zirconium basis (0.050% by mass on a $CO_3$ basis) relative to lithium cobaltate. The amount of the compound containing zirconium and a carbonate adhered is equal to the number of moles of erbium in the compound containing erbium and a carbonate used in Example 1 in terms of the number of moles of zirconium. This test cell is hereinafter referred to as "Comparative Battery Z7".

Experiment

Examples Batteries A1 to A3 and Comparative Batteries Z1 to Z7 were charged and discharged as shown below to investigate the initial charge-discharge characteristic (initial efficiency) and high-temperature continuous charge characteristics (amount of battery swelling, the capacity retention, the capacity recovery ratio, and discharge voltage drop). The results are presented in Table 1.

[Charge-Discharge Conditions in Investigating Initial Charge-Discharge Characteristic]

After each battery was charged at a constant current of 1.0 It (750 mA) up to a battery voltage of 4.40 V, the battery was charged at a constant of 4.40 V up to a current of It/20 (37.5 mA) and then the initial charge capacity was determined. After 10 minutes of recess, the battery was discharged at a constant current of 1.0 It (750 mA) until the battery voltage was 2.75 V to determine the initial discharge capacity. The initial efficiency was determined from equation (1) below using the initial charge capacity and the initial discharge capacity determined as such:

Initial efficiency (%)=(initial discharge capacity/initial charge capacity)100 (1)

[Charge-Discharge Conditions Etc. for Investigating High-Temperature Continuous Charge Characteristic]

Charge-discharge operation was conducted once under the same conditions as those for investigating the initial charge-discharge characteristic and the discharge capacity was measured. The battery was then left in a thermostat at 60° C. for 1 hour. Next, in a 60° C. environment, the battery was charged at a constant current of 1.0 It (750 mA) up to a battery voltage of 4.40 V, and then charged at a constant voltage of 4.40 V. The total charging time in the 60° C. environment was 60 hours. Each battery was taken out from the thermostat at 60° C. and the thickness of the battery was measured. The battery was then cooled to room temperature. The capacity retention represented by equation (2), the capacity recovery ratio represented by equation (3), and the discharge voltage drop indicated below were measured at room temperature.

Capacity retention (%)=(first-cycle discharge capacity after continuous charge test/discharge capacity before continuous charge test)100 (2)

(The "first-cycle discharge capacity" is the discharge capacity measured during discharge conducted after the battery was cooled to room temperature as above (first cycle).)

Capacity recovery ratio (%)=(second-cycle discharge capacity after continuous charge test/discharge capacity before continuous charge test)100 (3)

(The "second-cycle discharge capacity" is the discharge capacity measured during discharge conducted after the battery discharged as above is recharged (second cycle).)

Figure 3:
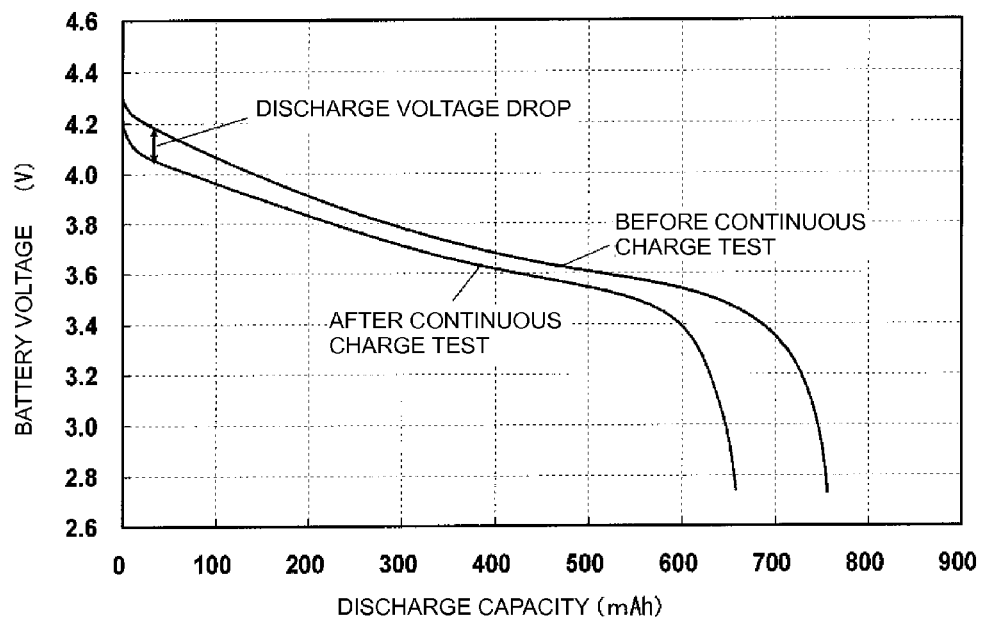
FIG. 3 is a graph showing a discharge voltage drop of Example Battery A1.
Figure 4:
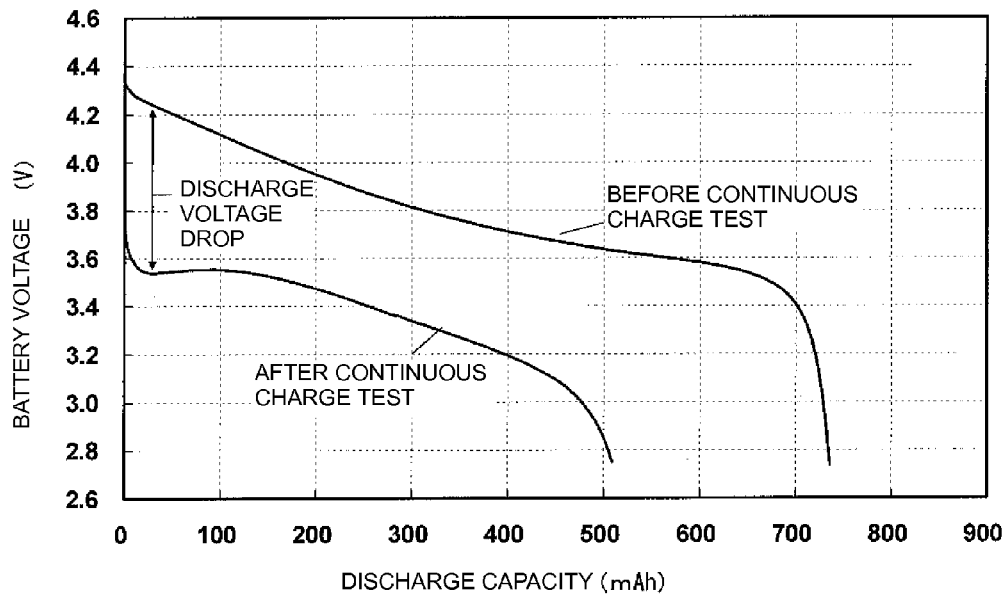
FIG. 4 is a graph showing a discharge voltage drop of Comparative Battery Z1.

Discharge voltage drop (V): the maximum difference between the discharge curve before continuous charge test and the discharge curve of the first measurement after the continuous charge test (where the discharge capacity was set in the range of 0 to 200 mAh). The discharge curves of Example Battery A1 are shown in FIG. 3 and the discharge curves of Comparative Battery Z1 are shown in FIG. 4. The discharge voltage drop is also indicated in each graph.

TABLE 1

| Type of battery | Element | Heat treatment temperature (° C.) | Ratio on cation basis (% by mass) | Ratio on $CO_3$ basis (% by mass) | Initial efficiency (%) | Amount of battery swelling (mm) | Capacity retention (%) | Capacity recovery ratio (%) | Discharge voltage drop (mV) |
|---|---|---|---|---|---|---|---|---|---|
| Example Battery A1 | Er | 300 | 0.069 | 0.037 | 88.0 | 0.53 | 87.0 | 85.3 | 120 |
| Example Battery A2 | Er | 300 | 0.017 | 0.0093 | 87.8 | 0.48 | 84.9 | 84.8 | 130 |
| Example Battery A3 | Er | 300 | 0.34 | 0.18 | 86.8 | 0.95 | 82.8 | 83.8 | 280 |
| Comparative Battery Z1 | — | — | 0 | 0 | 87.1 | 3.74 | 69.2 | 62.9 | 710 |
| Comparative Battery Z2 | Er | 300 | 0.43 | 0.23 | 84.7 | 1.38 | 78.3 | 77.5 | 340 |

TABLE 1-continued

| Type of battery | Element | Heat treatment temperature (° C.) | Ratio on cation basis (% by mass) | Ratio on $CO_3$ basis (% by mass) | Initial efficiency (%) | Amount of battery swelling (mm) | Capacity retention (%) | Capacity recovery ratio (%) | Discharge voltage drop (mV) |
|---|---|---|---|---|---|---|---|---|---|
| Comparative Battery Z3 | Er (added) | 300 | 0.069 | 0.037 | 87.1 | 4.27 | 67.6 | 61.9 | 460 |
| Comparative Battery Z4 | Er (added) | 300 | 0.58 | 0.31 | 87.1 | 5.02 | 78.8 | 66.9 | 440 |
| Comparative Battery Z5 | Er (oxide) | 600 | 0.069 | 0.037 | 84.3 | 1.53 | 75.2 | 73.6 | 420 |
| Comparative Battery Z6 | Mg | 300 | 0.010 | 0.025 | 86.8 | 3.06 | 72.5 | 72.3 | 590 |
| Comparative Battery Z7 | Zr | 300 | 0.038 | 0.050 | 87.2 | 2.63 | 74.6 | 69.0 | 590 |

Table 1 shows that the initial efficiency is high in Example Batteries A1 to A3 in which a compound 100 nm or less in particle size and containing erbium and a carbonate (hereinafter this compound may be simply referred to as "erbium compound") is adhered to a surface of a lithium cobaltate particle and the amount of adhered erbium compound relative to the lithium cobaltate is 0.40% by mass or less on an elemental erbium basis. Moreover, in Example Batteries A1 to A3, the decomposability of the electrolyte during continuous charge at high temperature is reduced, gassing is reduced, and formation of the film is suppressed. Thus, the amount of swelling of the battery is small, the capacity retention and the capacity recovery ratio are high, and the discharge voltage drop is small (also refer to FIG. 3 in addition to Table 1).

In contrast, in Comparative Battery Z1 in which the erbium compound is not adhered to the surface of the lithium cobaltate particle, although the initial efficiency is comparable to that of Example Batteries A1 to A3, decomposition of the electrolyte during continuous charge at high temperature is not reduced, a large quantity of gas is generated, and the formation of film is not suppressed. Due to these reasons, the amount of swelling of the battery is large, the capacity retention and the capacity recovery ratio are low, and the discharge voltage drop is large (also refer to FIG. 4 in addition to Table 1).

In Comparative Battery Z2 in which an erbium compound 100 nm or less in particle size is adhered to the surface of the lithium cobaltate particle but the amount of the adhering compound relative to lithium cobaltate exceeds 0.40% by mass (0.43% by mass) on an elemental erbium basis, the surface of lithium cobaltate particle is covered with an excessive amount of erbium compound not contributing to the charge-discharge reaction and thus the resistance is increased. Its initial efficiency, capacity retention, and capacity recovery ratio are low, and the discharge voltage drop is large. The amount of swelling of the battery is also large.

In Comparative Batteries Z3 and Z4 in which erbium carbonate was added to the positive electrode active material slurry, although the initial efficiency is comparable to that of Example Batteries A1 to A3, the decomposability of the electrolyte during continuous charge at high temperature remains high due to segregation of erbium carbonate on recesses or the like in the surface of the lithium cobaltate particle (erbium carbonate is not adhered to the surface of the positive electrode active material particle in a dispersed form). This results in generation of a large quantity of gas and failure to suppress formation of films. As a result, the amount of swelling of the battery is large, the capacity retention and the capacity recovery ratio are low, and the discharge voltage drop is large.

In Comparative Battery Z5 heat-treated at a temperature of 600° C., the erbium compound is transformed to an oxide and part of the erbium compound is diffused in the positive electrode active material. Thus, the initial charge-discharge efficiency is low. Since the effect of suppressing the decomposition of the electrolyte is also low, the amount of swelling of battery is large, the capacity retention and the capacity recovery ratio are low, and the discharge voltage drop is large.

In Comparative Batteries Z6 and Z7 in which no rare earth element was contained and a compound containing Mg or Zr and a carbonate was adhered to the surface of the lithium cobaltate particle, the initial efficiency is comparable to that of Example Batteries A1 to A3. However, since gassing is not substantially suppressed by adhering a compound not contributing to reaction to the surface of lithium cobaltate (the electrolyte and lithium cobaltate do not come into direct contact with each other), the amount of swelling of the battery is large, the capacity retention and the capacity recovery ratio are low, and the discharge voltage drop is large. This indicates that coating lithium cobaltate with an erbium compound specifically suppresses the decomposition of the electrolyte.

Second Example

In the Second Example, the effect of using a rare earth element other than erbium was investigated.

Example 1

A battery was fabricated as in Example 1 of the First Example except that lanthanum nitrate hexahydrate was used instead of erbium nitrate pentahydrate and that a compound containing lanthanum and carbonate was adhered to the surface of the lithium cobaltate particle in an evenly dispersed form. The amount of the compound containing lanthanum and a carbonate was 0.057% by mass on an elemental lanthanum basis (0.037% by mass on a $CO_3$ basis) relative to lithium cobaltate. The amount of the adhering compound containing lanthanum and a carbonate is equal to the number of moles of the compound containing erbium and a carbonate used in Example 1 of the First Example in terms of the number of moles of lanthanum. This test cell is hereinafter referred to as "Example Battery B1".

Example 2

A battery was fabricated as in Example 1 of the First Example except that neodymium nitrate hexahydrate was used instead of erbium nitrate pentahydrate and that a compound containing neodymium and a carbonate was adhered to the surface of the lithium cobaltate particle in an evenly dispersed form. The amount of the compound containing neodymium and a carbonate was 0.059% by mass on an elemental neodymium basis (0.037% by mass on a $CO_3$ basis) relative to lithium cobaltate. The amount of the adhering compound containing neodymium and a carbonate is equal to the number of moles of erbium in the compound containing erbium and a carbonate used in Example 1 of the First Example in terms of the number of moles of neodymium. This test cell is hereinafter referred to as "Example Battery B2".

Example 3

A battery was fabricated as in Example 1 of the First Example except that samarium nitrate hexahydrate was used instead of erbium nitrate pentahydrate and a compound containing samarium and a carbonate was adhered to the surface of the lithium cobaltate particle in an evenly dispersed form. The amount of the compound containing samarium and a carbonate was 0.062% by mass on an elemental samarium basis (0.037% by mass on a $CO_3$ basis) relative to lithium cobaltate. The amount of the adhering compound containing samarium and a carbonate was equal to the number of moles of erbium in the compound containing erbium and a carbonate used in Example 1 of the First Example in terms of the number of moles of samarium. This test cell is hereinafter referred to as "Example Battery B3".

Example 4

A battery was fabricated as in Example 1 of the First Example except that europium nitrate hexahydrate was used instead of erbium nitrate pentahydrate and a compound containing europium and a carbonate was adhered to the surface of the lithium cobaltate particle in an evenly dispersed form. The amount of the compound containing europium and a carbonate was 0.062% by mass on an elemental europium basis (0.037% by mass on a $CO_3$ basis) relative to lithium cobaltate. The amount of the adhering compound containing europium and a carbonate was equal to the number of moles of erbium in the compound containing erbium and a carbonate used in Example 1 of the First Example in terms of the number of moles of europium. This test cell is hereinafter referred to as "Example Battery B4".

Example 5

A battery was fabricated as in Example 1 of the First Example except that ytterbium nitrate trihydrate was used instead of erbium nitrate pentahydrate and a compound containing ytterbium and a carbonate was adhered to the surface of the lithium cobaltate particle in an evenly dispersed form. The amount of the compound containing ytterbium and a carbonate was 0.071% by mass on an elemental ytterbium basis (0.037% by mass on a $CO_3$ basis) relative to lithium cobaltate. The amount of the adhering compound containing ytterbium and a carbonate was equal to the number of moles of erbium in the compound containing erbium and a carbonate used in Example 1 of the First Example in terms of the number of moles of ytterbium. This test cell is hereinafter referred to as "Example Battery B5".

Example 6

A battery was fabricated as in Example 1 of the First Example except that lutetium nitrate trihydrate was used instead of erbium nitrate pentahydrate and a compound containing lutetium and a carbonate was adhered to the surface of the lithium cobaltate particle in an evenly dispersed form. The amount of the compound containing lutetium and a carbonate was 0.072% by mass on an elemental lutetium basis (0.037% by mass on a $CO_3$ basis) relative to lithium cobaltate. The amount of the adhering compound containing lutetium and a carbonate was equal to the number of moles of erbium in the compound containing erbium and a carbonate used in Example 1 of the First Example in terms of the number of moles of lutetium. This test cell is hereinafter referred to as "Example Battery B6".

Experiment

Example Batteries B1 to B6 were charged and discharged to investigate the initial charge-discharge characteristic (initial efficiency) and high-temperature continuous charge characteristics (amount of swelling of battery, capacity retention, capacity recovery ratio, and discharge voltage drop). The results are shown in Table 2. The experimental conditions were the same as the experiment conducted in the First Example. The experimental results of Example Battery A1 are also indicated in Table 2 for reference.

TABLE 2

| Type of battery | Element | Heat treatment temperature (° C.) | Ratio on cation basis (% by mass) | Ratio on $CO_3$ basis (% by mass) | Initial efficiency (%) | Amount of battery swelling (mm) | Capacity retention (%) | Capacity recovery ratio (%) | Discharge voltage drop (mV) |
|---|---|---|---|---|---|---|---|---|---|
| Example Battery A1 | Er | 300 | 0.069 | 0.037 | 88.0 | 0.53 | 87.0 | 85.3 | 120 |
| Example Battery B1 | La | 300 | 0.057 | 0.037 | 87.5 | 0.49 | 86.7 | 84.8 | 150 |
| Example Battery B2 | Nd | 300 | 0.059 | 0.037 | 88.0 | 0.53 | 86.9 | 85.1 | 130 |
| Example Battery B3 | Sm | 300 | 0.062 | 0.037 | 88.1 | 0.51 | 86.3 | 84.0 | 170 |
| Example Battery B4 | Eu | 300 | 0.062 | 0.037 | 87.5 | 0.42 | 86.3 | 85.1 | 180 |
| Example Battery B5 | Yb | 300 | 0.071 | 0.037 | 87.6 | 0.58 | 85.8 | 82.1 | 200 |
| Example Battery B6 | Lu | 300 | 0.072 | 0.037 | 87.8 | 0.73 | 83.9 | 83.1 | 240 |

Table 2 shows that in Example Batteries B1 to B6 in which a compound containing a carbonate and a rare earth element such as lanthanum, neodymium, samarium, europium, ytterbium, or lutetium was adhered to the surface of lithium cobaltate, the initial efficiency is high, the amount of the swelling of the battery is small, the capacity retention and the capacity recovery ratio are high, and the discharge voltage drop is small as with Example Battery A1 in which a compound containing erbium and a carbonate is adhered to the surface of lithium cobaltate. In particular, Example Batteries B1 to B4 that use lanthanum, neodymium, samarium, and europium and Example Battery A1 that uses erbium exhibit significantly improved characteristics.

Third Example

Example 1

A battery was fabricated as in Example 1 of the First Example except that the Ni:Co:Mn molar ratio in the positive electrode active material particle was 6:2:2 and a Ni—Co—Mn lithium complex oxide having a layered structure (hereinafter this complex oxide may be referred to as "layered NCM") was used. This test cell is hereinafter referred to as "Example Battery C".

Comparative Example 1

A battery was fabricated as in Example 1 above except that a compound containing erbium and a carbonate was not adhered to the surface of the positive electrode active material particle. This test cell is hereinafter referred to as "Comparative Battery Y".

Experiment

Example Battery C and Comparative Battery Y were charged and discharged to investigate the initial charge-discharge characteristic (initial efficiency) and high-temperature continuous charge characteristics (amount of swelling of battery, capacity retention, capacity recovery ratio, and discharge voltage drop). The results are shown in Table 3. The experimental conditions were the same as those of the First Example.

sition of the electrolyte as in the case of using layered lithium cobaltate as the positive electrode active material particle.

Fourth Example

Example 1

A battery was fabricated as in Example 1 of the First Example except that not only were lithium hexafluorophosphate and vinylene carbonate added to the mixed solvent but also adiponitrile was added to the mixed solvent at a ratio of 1% by mass relative to the mixed solvent. This test cell is hereinafter referred to as "Example Battery D1".

Example 2

A battery was fabricated as in Example 1 of the First Example except that not only were lithium hexafluorophosphate and vinylene carbonate added to the mixed solvent but also succinonitrile was added to the mixed solvent at a ratio of 1% by mass relative to the mixed solvent. This test cell is hereinafter referred to as "Example Battery D2".

Example 3

A battery was fabricated as in Example 1 of the First Example except that not only were lithium hexafluorophosphate and vinylene carbonate added to the mixed solvent but also glutaronitrile was added to the mixed solvent at a ratio of 1% by mass relative to the mixed solvent. This test cell is hereinafter referred to as "Example Battery D3".

Example 4

A battery was fabricated as in Example 1 of the First Example except that not only were lithium hexafluorophosphate and vinylene carbonate added to the mixed solvent but also pimelonitrile was added to the mixed solvent at a ratio of 1% by mass relative to the mixed solvent. This test cell is hereinafter referred to as "Example Battery D4".

TABLE 3

| Type of battery | Type of active material | Element | Heat treatment temperature (° C.) | Ratio on cation basis (% by mass) | Ratio on CO$_3$ basis (% by mass) | Initial efficiency (%) | Battery swelling (mm) | Capacity retention (%) | Capacity recovery ratio (%) | Discharge voltage drop (mV) |
|---|---|---|---|---|---|---|---|---|---|---|
| Example Battery C | Layered NCM | Er | 300 | 0.069 | 0.037 | 78.6 | 0.22 | 89.2 | 84.7 | 88.9 |
| Comparative Battery Y | — | — | — | 0 | 0 | 77.3 | 1.05 | 73.2 | 68.9 | 152.7 |

Table 3 shows that Example Battery C in which the layered NCM was used in the positive electrode active material particle and a compound containing erbium and a carbonate was adhered to the surface of the positive electrode active material particle exhibited a higher initial efficiency, a low amount of swelling of the battery, high capacity retention and recovery ratio, and a small discharge voltage drop compared to Comparative Battery Y in which a compound containing erbium and a carbonate was not adhered to the surface of the same positive electrode active material particle. This is presumably due to the presence of the compound adhered to the surface of the positive electrode active material particle, which significantly decreased the catalytic property of the positive electrode active material and significantly suppresses decompo- Example 5

A battery was fabricated as in Example 1 of the First Example except that not only were lithium hexafluorophosphate and vinylene carbonate added to the mixed solvent but also 1,2,3-propanetricarbonitrile was added to the mixed solvent at a ratio of 1% by mass relative to the mixed solvent. This test cell is hereinafter referred to as "Example Battery D5".

Example 6

A battery was fabricated as in Example 1 of the First Example except that not only were lithium hexafluorophosphate and vinylene carbonate added to the mixed solvent but also butyronitrile was added to the mixed solvent at a ratio of 1% by mass relative to the mixed solvent. This test cell is hereinafter referred to as "Example Battery D6".

Comparative Example

A battery was fabricated as in Comparative Example 7 of the First Example except that not only were lithium hexafluorophosphate and vinylene carbonate added to the mixed solvent but also glutaronitrile was added to the mixed solvent at a ratio of 1% by mass relative to the mixed solvent. This test cell is hereinafter referred to as "Comparative Battery X".

Experiment

Example Batteries D1 to D6 and Comparative Battery X were charged and discharged to investigate the initial charge-discharge characteristic (initial efficiency) and high-temperature continuous charge characteristics (amount of swelling of battery, capacity retention, capacity recovery ratio, and discharge voltage drop). The results are shown in Table 4. The experimental conditions were the same as those of the First Example. The experimental results of Example Battery A1 and Comparative Battery Z7 are also indicated in Table 4 for reference.

The results show that the specific effect of improving the characteristics by addition of a nitrile compound is exhibited only when a carbonate compound of a rare earth element is adhered to the positive electrode active material particle as in Example Battery D1. The reason therefor is presumably as follows. When a rare earth element is present as in Example Battery D1, a film is satisfactorily formed due to the nitrile compound and suppresses the decomposition of the electrolyte. In addition, deposition of the decomposition products of the electrolyte on the electrode surface can be suppressed. However, when no rare earth element is present as in Comparative Battery Z7, these effects do not arise.

The same effects are attained by Example Batteries D2 to D6 in which succinonitrile, glutaronitrile, pimelonitrile, 1,2,3-propanetricarbonitrile, or butyronitrile is added to the electrolyte instead of adiponitrile. In particular, Example Batteries D2 to D5 in which the number of nitrile groups is 2 or 3 attain favorable effects. Accordingly, when a carbonate compound of a rare earth element is adhered to the positive electrode active material particle, a nitrile compound is preferably added to the electrolyte. More preferably, a nitrile compound having two or three nitrile groups is added.

TABLE 4

| Type of battery | Element | Heat treatment temperature (°C.) | Ratio on cation basis (% by mass) | Ratio on CO₃ basis (% by mass) | Nitrile compound Type (No. of nitrile groups) | No. of carbon atoms | Amount added (% by mass) | Initial efficiency (%) | Battery swelling (mm) | Capacity retention (%) | Capacity recovery ratio (%) | Discharge voltage drop (mV) |
|---|---|---|---|---|---|---|---|---|---|---|---|---|
| Example Battery A1 | Er | 300 | 0.069 | 0.037 | — | | 0 | 88.0 | 0.53 | 87.0 | 85.3 | 120 |
| Example Battery D1 | Er | 300 | 0.069 | 0.037 | Adiponitrile (2) | 6 | 1 | 87.8 | 0.07 | 96.3 | 88.8 | 34 |
| Comparative Battery Z7 | Zr | 300 | 0.038 | 0.050 | — | | 0 | 87.2 | 2.63 | 74.6 | 69.0 | 590 |
| Comparative Battery X | Zr | 300 | 0.038 | 0.050 | Adiponitrile (2) | 6 | 1 | 86.2 | 0.20 | 74.9 | 61.8 | 740 |
| Example Battery D2 | Er | 300 | 0.069 | 0.037 | Succinonitrile (2) | 4 | 1 | 87.2 | 0.07 | 96.8 | 90.0 | 70 |
| Example Battery D3 | Er | 300 | 0.069 | 0.037 | Glutaronitrile (2) | 5 | 1 | 87.5 | 0.07 | 97.0 | 91.3 | 39 |
| Example Battery D4 | Er | 300 | 0.069 | 0.037 | Pimelonitrile (2) | 7 | 1 | 87.2 | 0.16 | 97.0 | 90.5 | 39 |
| Example Battery D5 | Er | 300 | 0.069 | 0.037 | 1,2,3-Propanetricarbonitrile (3) | 6 | 1 | 87.2 | 0.04 | 96.9 | 90.8 | 34 |
| Example Battery D6 | Er | 300 | 0.069 | 0.037 | Butyronitrile (1) | 4 | 1 | 87.2 | 0.18 | 91.9 | 86.3 | 85 |

Carbon atoms in nitrile groups are also included in the count of the number of carbon atoms in the nitrile compound.

Table 4 shows that the swelling of the battery is less in Example Battery D1 and Comparative Battery X that contain adiponitrile in the electrolyte compared to Example Battery A1 and Comparative Battery Z7 that do not contain adiponitrile. This is presumably due to formation of a film on the surface of the positive electrode active material particle, which suppresses decomposition of the electrolyte during continuous charge test. Compared to Example Battery A1, Example Battery D1 exhibits an improved capacity retention, an improved capacity recovery ratio, and a significantly small discharge voltage drop. In contrast, Compared to Comparative Battery Z7, Comparative Battery X shows no improvement in terms of the capacity retention and the capacity recovery ratio and its discharge voltage drop is significantly large.

Reference Examples

Reference Example 1

A battery was fabricated as in Comparative Example 1 of the First Example except that a lithium manganese complex oxide having a spinel structure (this complex oxide is also referred to as a "spinel Mn" hereinafter) was used as the positive electrode active material particle. This test cell is hereinafter referred to as "Reference Battery W1".

Reference Example 2

A battery was fabricated as in Example 1 of the Second Example except that a lithium manganese complex oxide having a spinel structure was used as the positive electrode active material particle. This test cell is hereinafter referred to as "Reference Battery W2".

Reference Example 3

A battery was fabricated as in Example 3 of the Second Example except that a lithium manganese complex oxide having a spinel structure was used as the positive electrode active material particle. This test cell is hereinafter referred to as "Reference Battery W3".

Experiment

Reference Batteries W1 to W3 were charged and discharged to investigate the initial charge-discharge characteristic (initial efficiency) and high-temperature continuous charge characteristics (amount of swelling of battery, capacity retention, capacity recovery ratio, and discharge voltage drop). The results are shown in Table 5. The experimental conditions were the same as those of the First Example except that the charge cut-off voltage was set to 4.20 V.

TABLE 5

| Type of battery | Type of active material | Element | Heat treatment temperature (°C.) | Ratio on cation basis (% by mass) | Ratio on $CO_3$ basis (% by mass) | Initial efficiency (%) | Battery swelling (mm) | Capacity retention (%) | Capacity recovery ratio (%) | Discharge voltage drop (mV) |
|---|---|---|---|---|---|---|---|---|---|---|
| Reference Battery W1 | Spinel Mn | — | — | 0 | 0 | 88.0 | 0.22 | 93.3 | 93.1 | 37.6 |
| Reference Battery W2 | | La | 300 | 0.057 | 0.037 | 87.8 | 0.21 | 92.8 | 92.6 | 29.4 |
| Reference Battery W3 | | Sm | 300 | 0.062 | 0.037 | 87.8 | 0.23 | 92.3 | 92.0 | 32.8 |

Table 5 shows that when a lithium manganese complex oxide having a spinel structure is used as the positive electrode active material particle, Reference Batteries W2 and W3 in which a compound containing a rare earth element such as lanthanum or a samarium and a carbonate on the surface of the particle do not exhibit effects of improving the initial efficiency, the amount of the swelling of the battery during high-temperature continuous charge, the capacity retention, the capacity recovery ratio, and the discharge voltage drop as much as Reference Battery W1 in which a compound containing a rare earth element and a carbonate is not adhered to the particle surface. This is presumably due to the following reason. A lithium manganese complex oxide having a spinel structure is itself an active material that does not easily decompose the electrolyte. Thus, the effect attained by adhering a compound containing a rare earth element and a carbonate to the particle surface is comparatively small.

The present invention may be applied to usages that require a particularly high capacity for driving power sources of mobile information terminals such as cellular phones, notebook computers, and personal digital assistants (PDAs). Moreover, the present invention may be expanded to usages that require high capacity for continuous driving at high temperature in a severe operation environment for batteries, such as hybrid electric vehicles and electric tools.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A nonaqueous electrolyte secondary battery comprising:
   a positive electrode;
   a negative electrode;
   a separator; and
   a nonaqueous electrolyte, wherein
   the positive electrode comprising a positive electrode active material,
   the positive electrode active material comprising:
   positive electrode active material particles; and
   particles comprising a compound containing a rare earth element and a carbonate,
   wherein the particles comprising a compound containing a rare earth element and a carbonate have a particle size of 1 to 100 nm and the particles comprising a compound containing a rare earth element and a carbonate are directly dispersed particles on the positive electrode active material particles, and
   wherein the ratio of the particles comprising a compound containing a rare earth element and a carbonate relative to the positive electrode active material particles is 0.005% to 0.4% by mass on a rare earth element basis, and
   the positive electrode active material particles are composed of a lithium transition metal oxide having a layered structure.

2. The nonaqueous electrolyte secondary battery according to claim 1, wherein the nonaqueous electrolyte comprises a nitrile compound comprising a chain saturated hydrocarbon group and a nitrile group.

3. The nonaqueous electrolyte secondary battery according to claim 2, wherein the number of nitrile groups in the nitrile compound is 2 or 3.

4. A method for making the nonaqueous electrolyte secondary battery of claim 1, comprising making the nonaqueous electrolyte secondary battery by:
   a compound adhering step of adhering particles comprising a compound containing a rare earth element and a carbonate to a surface of a positive electrode active material particle, the compound adhering step comprising
   mixing a positive electrode active material particle with a solution in which carbon dioxide is dissolved, and
   adding a solution in which a salt containing at least one element selected from rare earth elements is dissolved.

5. The method according to claim 4, further comprising:
   a heat treatment step of conducting heat treatment at a temperature of 500° C. or less after the compound adhering step.

6. The method according to claim 4, wherein a bubbling technique is used to dissolve carbon dioxide in the solution.

7. The method according to claim 5, wherein a bubbling technique is used to dissolve carbon dioxide in the solution.

8. The method according to claim 5, wherein the heat treatment step is conducted at a temperature of from 80° C. to 500° C.

9. The nonaqueous electrolyte secondary battery according to claim 1, wherein the size of the particles comprising a compound containing a rare earth element and a carbonate compound are from 1 nm to 50 nm.

10. The nonaqueous electrolyte secondary battery according to claim 1, wherein said lithium transition metal oxide comprises at least one selected from the group consisting of lithium cobaltate, a Ni—Co—Mn lithium complex oxide, a Ni—Al—Mn lithium complex oxide, and a Ni—Co—Al lithium complex oxide.

11. The nonaqueous electrolyte secondary battery according to claim 1, wherein the ratio of the particles comprising a compound containing a rare earth element and a carbonate to the positive electrode active material particles is 0.01% to 0.34% by mass on a rare earth element basis.

12. The nonaqueous electrolyte secondary battery according to claim 1, wherein the particles comprising a compound containing a rare earth element and a carbonate are evenly dispersed particles on the positive electrode active material particles.

13. The nonaqueous electrolyte secondary battery according to claim 11, wherein the particles comprising a compound containing a rare earth element and a carbonate are evenly dispersed particles on the positive electrode active material particles.

14. The nonaqueous electrolyte secondary battery according to claim 1, wherein the rare earth element in the compound containing a rare earth element and a carbonate is at least one selected from erbium, lanthanum, neodymium, samarium, and europium.

15. The nonaqueous electrolyte secondary battery according to claim 11, wherein the rare earth element in the compound containing a rare earth element and a carbonate is at least one selected from erbium, lanthanum, neodymium, samarium, and europium.

16. The nonaqueous electrolyte secondary battery according to claim 13, wherein the rare earth element in the compound containing a rare earth element and a carbonate is at least one selected from erbium, lanthanum, neodymium, samarium, and europium.

\* \* \* \* \*